US012803124B2

(12) United States Patent
Sato

(10) Patent No.: US 12,803,124 B2
(45) Date of Patent: Nov. 17, 2026

(54) PROTECTOR AND BUSBAR MODULE

(71) Applicant: Yazaki Corporation, Tokyo (JP)

(72) Inventor: Katsunori Sato, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 186 days.

(21) Appl. No.: 19/013,235

(22) Filed: Jan. 8, 2025

(65) Prior Publication Data

US 2025/0253492 A1 Aug. 7, 2025

(30) Foreign Application Priority Data

Feb. 2, 2024 (JP) ................................ 2024-014526

(51) Int. Cl.

*H01M 50/507* (2021.01)
*H01M 50/519* (2021.01)
*H02G 5/02* (2006.01)

(52) U.S. Cl.

CPC ....... *H01M 50/507* (2021.01); *H01M 50/519* (2021.01); *H02G 5/02* (2013.01)

(58) Field of Classification Search

None
See application file for complete search history.

(56) References Cited

U.S. PATENT DOCUMENTS 6,300,561 B1 * 10/2001 Saito ................... B60R 16/0207 220/3.7
12,676,430 B2 * 7/2026 Okazaki ................... H01R 4/70
2020/0044376 A1 2/2020 Ichikawa et al.
2022/0037735 A1 * 2/2022 Shimizu .............. H01M 50/209
2023/0039725 A1 * 2/2023 Ichikawa ............ H01M 10/425
2023/0261333 A1 * 8/2023 Fukushima ......... H01M 50/298 439/67
2023/0291136 A1 * 9/2023 Matsumura ............ H05K 1/147
2024/0283116 A1 * 8/2024 Takahashi ........... H01M 50/591
2025/0233332 A1 * 7/2025 Sato .................... H01M 50/507
2026/0039052 A1 * 2/2026 Kataoka ................. H01R 11/12
2026/0100484 A1 * 4/2026 Kataoka .............. H01M 50/503

FOREIGN PATENT DOCUMENTS

EP 3072747 A2 * 9/2016 ......... B60R 16/0215
JP 2020-21595 A 2/2020
JP 2021069220 A * 4/2021 ........... H01R 25/161

* cited by examiner

*Primary Examiner* — Krystal Robinson
(74) *Attorney, Agent, or Firm* — Sughrue Mion, PLLC

(57) ABSTRACT

A protector includes: a first passage portion extending in a first direction; and a second passage portion extending in a second direction orthogonal to the first direction, in which the second direction is a fitting direction in which a connector connected to a flexible printed circuit board is fitted to a mating connector, the first passage portion has a bottom wall and side walls arranged on both sides of the bottom wall in a width direction, the bottom wall has a distal end which is an end on the second passage portion side, the first passage portion has slits extending between the bottom wall and the side walls such that the distal end is swingable in the second direction, and the second passage portion is connected to the distal end of the bottom wall and is swingable in the second direction.

4 Claims, 7 Drawing Sheets

PROTECTOR AND BUSBAR MODULE

CROSS-REFERENCE TO RELATED APPLICATION(S)

The present application claims priority to and incorporates by reference the entire contents of Japanese Patent Application No. 2024-014526 filed in Japan on Feb. 2, 2024.

BACKGROUND OF THE INVENTION

1. Field of the Invention

The present invention relates to a protector and a busbar module.

2. Description of the Related Art

In the related art, there is technology of connecting a connector connected to a flexible board to a mating connector. Japanese Patent Application Laid-open No. 2020-021595 discloses a circuit body with a connector including a circuit body including a flexible board provided with a wiring pattern and a connector attached to the circuit body.

It is desirable that the workability of work of connecting a connector connected to a flexible printed circuit board to a mating connector can be improved. For example, in a configuration in which the flexible printed circuit board is protected by a protector, it is desirable that the connector be positioned at an appropriate position with respect to the mating connector even if both the protector and the mating connector are fixed.

SUMMARY OF THE INVENTION

An object of the present invention is to provide a protector and a busbar module capable of improving workability of work of connecting a connector connected to a flexible printed circuit board to a mating connector.

In order to achieve the above mentioned object, a protector according to one aspect of the present invention includes a first passage portion extending in a first direction and capable of accommodating a flexible printed circuit board; and a second passage portion extending in a second direction orthogonal to the first direction and capable of accommodating the flexible printed circuit board, wherein the second direction is a fitting direction in which a connector connected to the flexible printed circuit board is fitted to a mating connector, the first passage portion has a bottom wall that supports the flexible printed circuit board and side walls arranged on both sides of the bottom wall in a width direction, the bottom wall has a distal end which is an end on a side of the second passage portion, the first passage portion has slits extending between the bottom wall and the side walls such that the distal end is swingable in the second direction, and the second passage portion is connected to the distal end of the bottom wall, the second passage portion swingable in the second direction.

In order to achieve the above mentioned object, a busbar module according to another aspect of the present invention includes the protector; the flexible printed circuit board; the connector connected to the flexible printed circuit board; and a plurality of busbars connected to the flexible printed circuit board, the plurality of busbars connectable to electrodes of battery cells.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a protector and a busbar module according to embodiments of the present invention will be described in detail with reference to the drawings. Note that the invention is not limited by the embodiments. In addition, components in the following embodiments include those that can be easily conceived of by those skilled in the art and those that are substantially the same.

Embodiments

Figure 1:
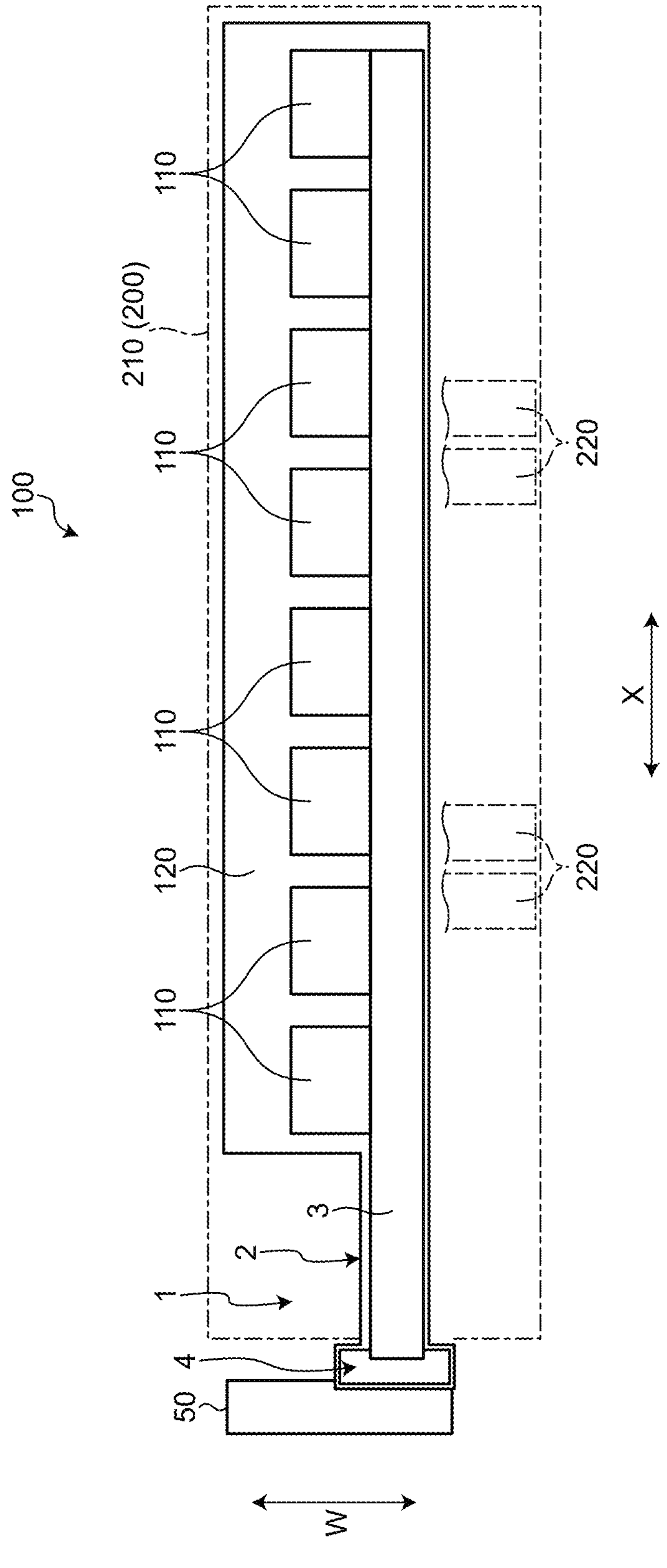
FIG. 1 is a plan view of a busbar module according to an embodiment.
Figure 2:
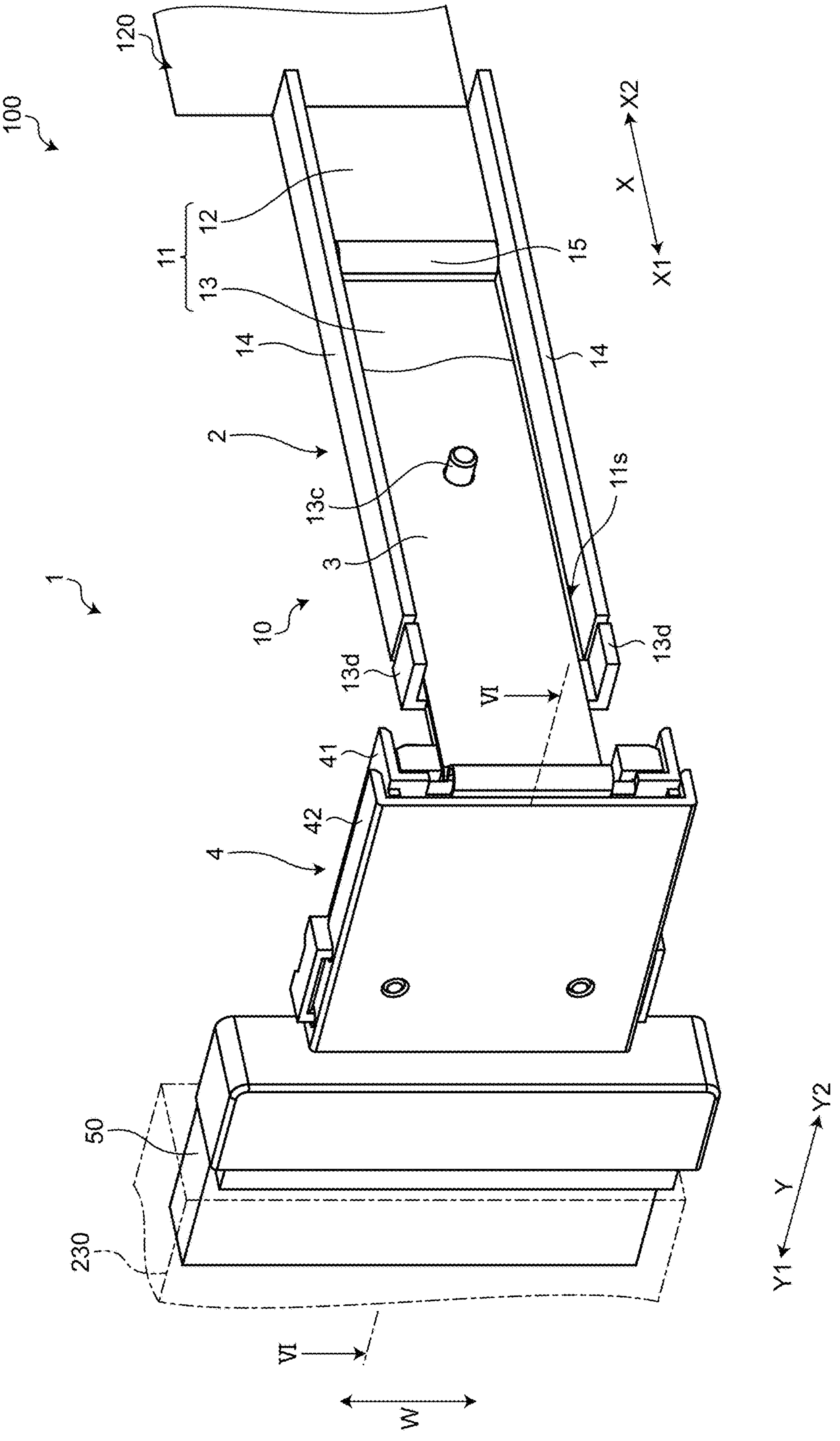
FIG. 2 is a perspective view of a protector of the embodiment.
Figure 3:
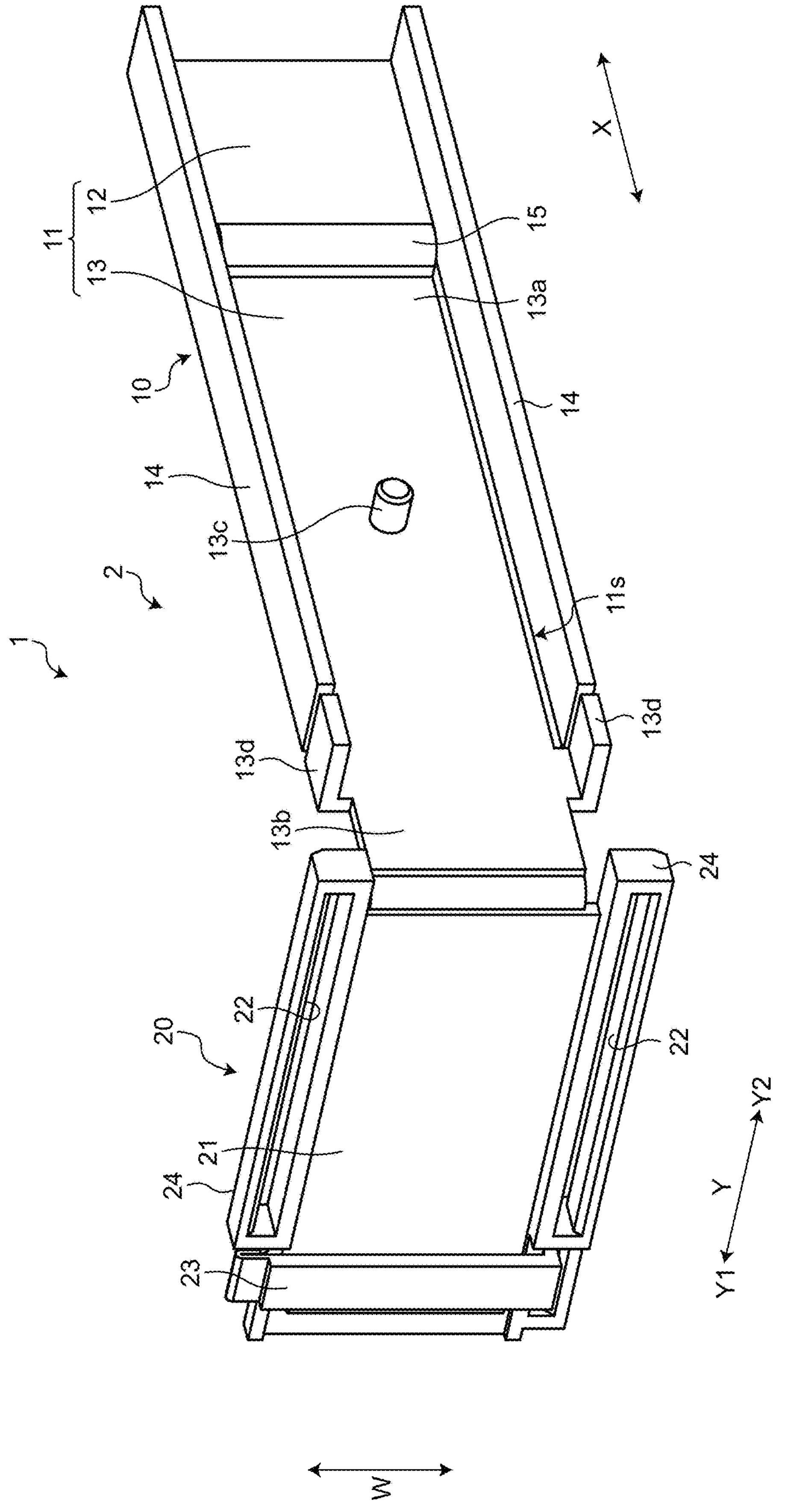
FIG. 3 is a perspective view of a protector body of the embodiment.
Figure 4:
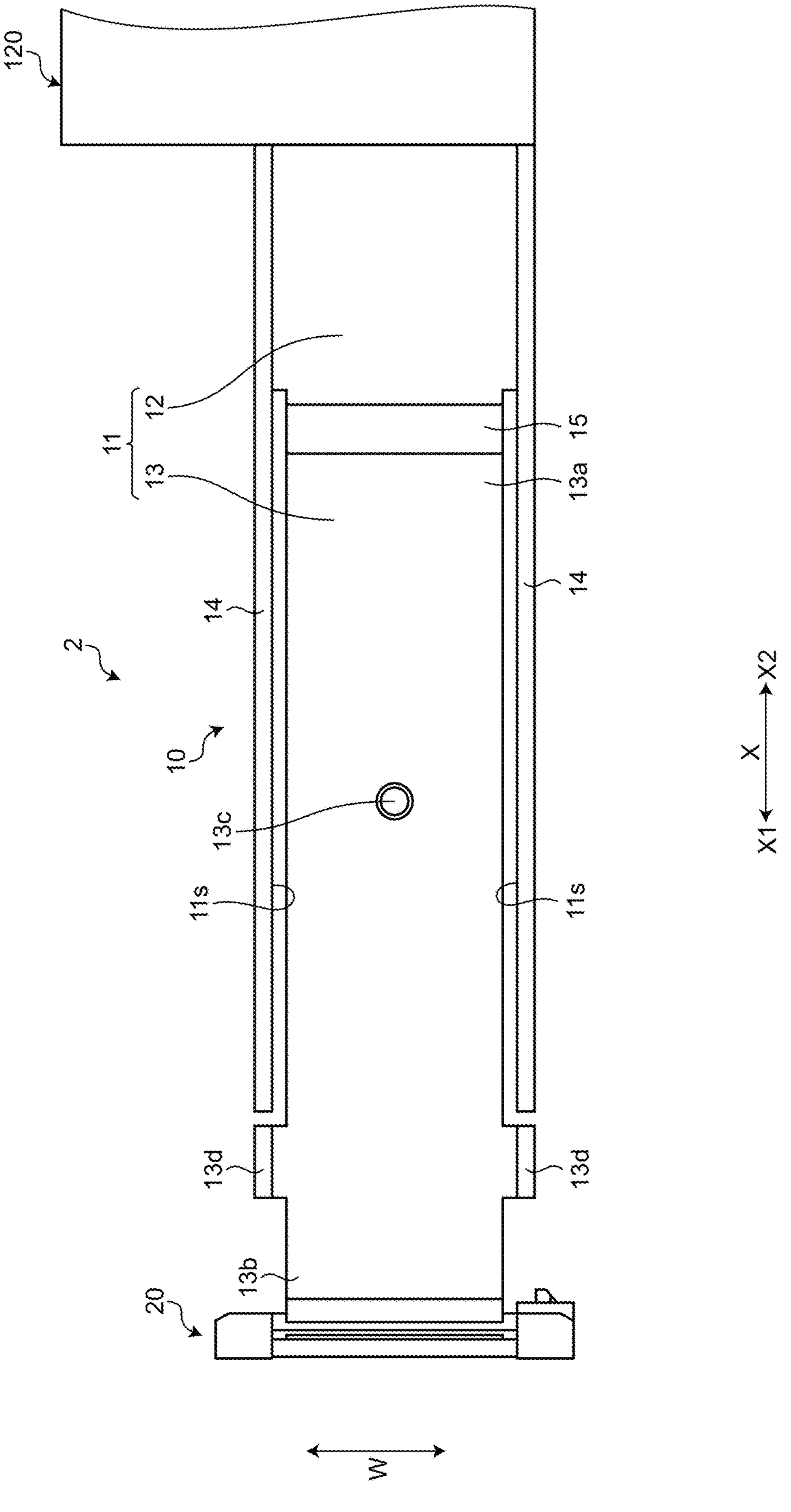
FIG. 4 is a plan view of the protector body according to the embodiment.
Figure 5:
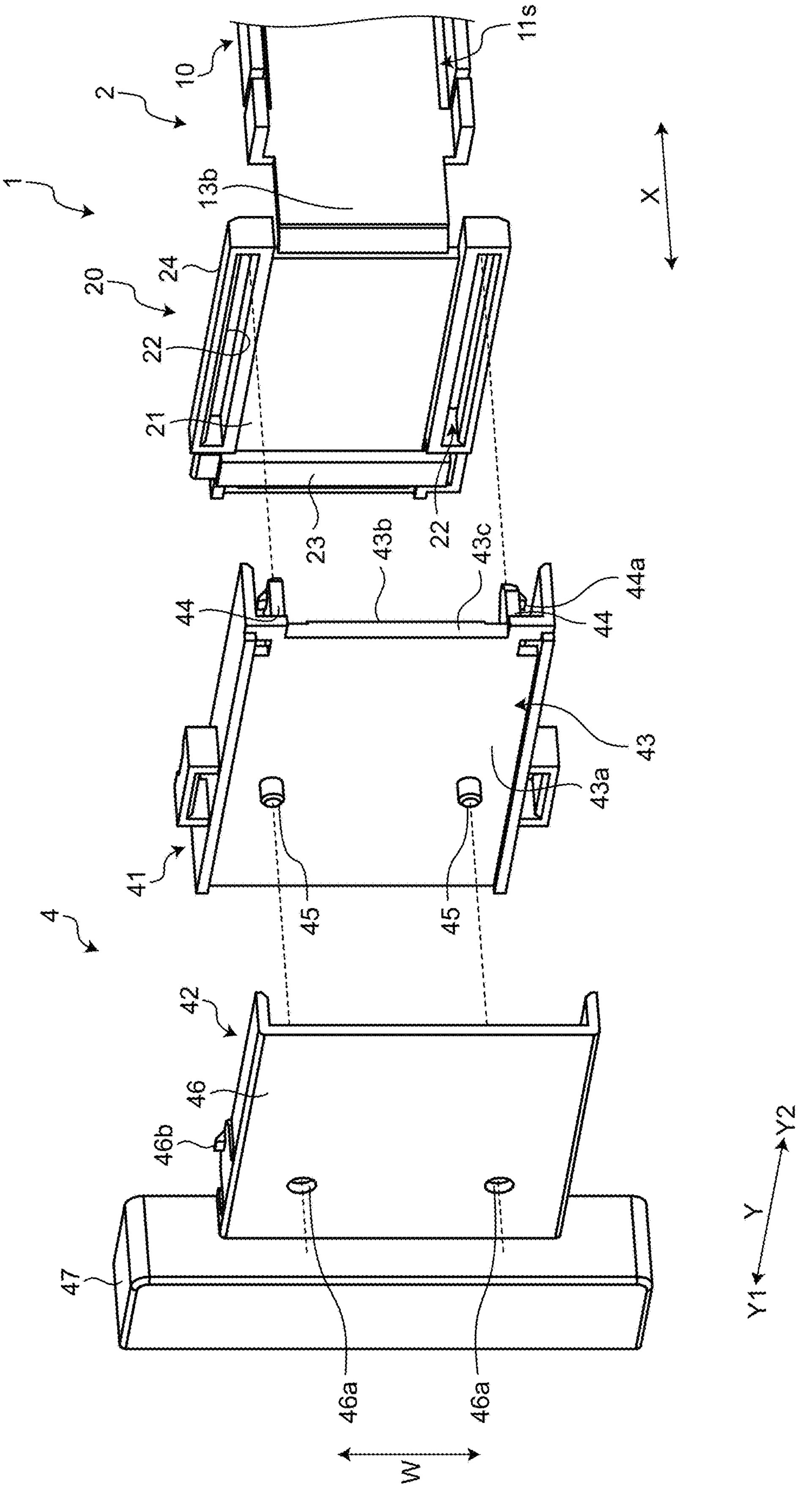
FIG. 5 is an exploded perspective view of the protector of the embodiment.
Figure 6:
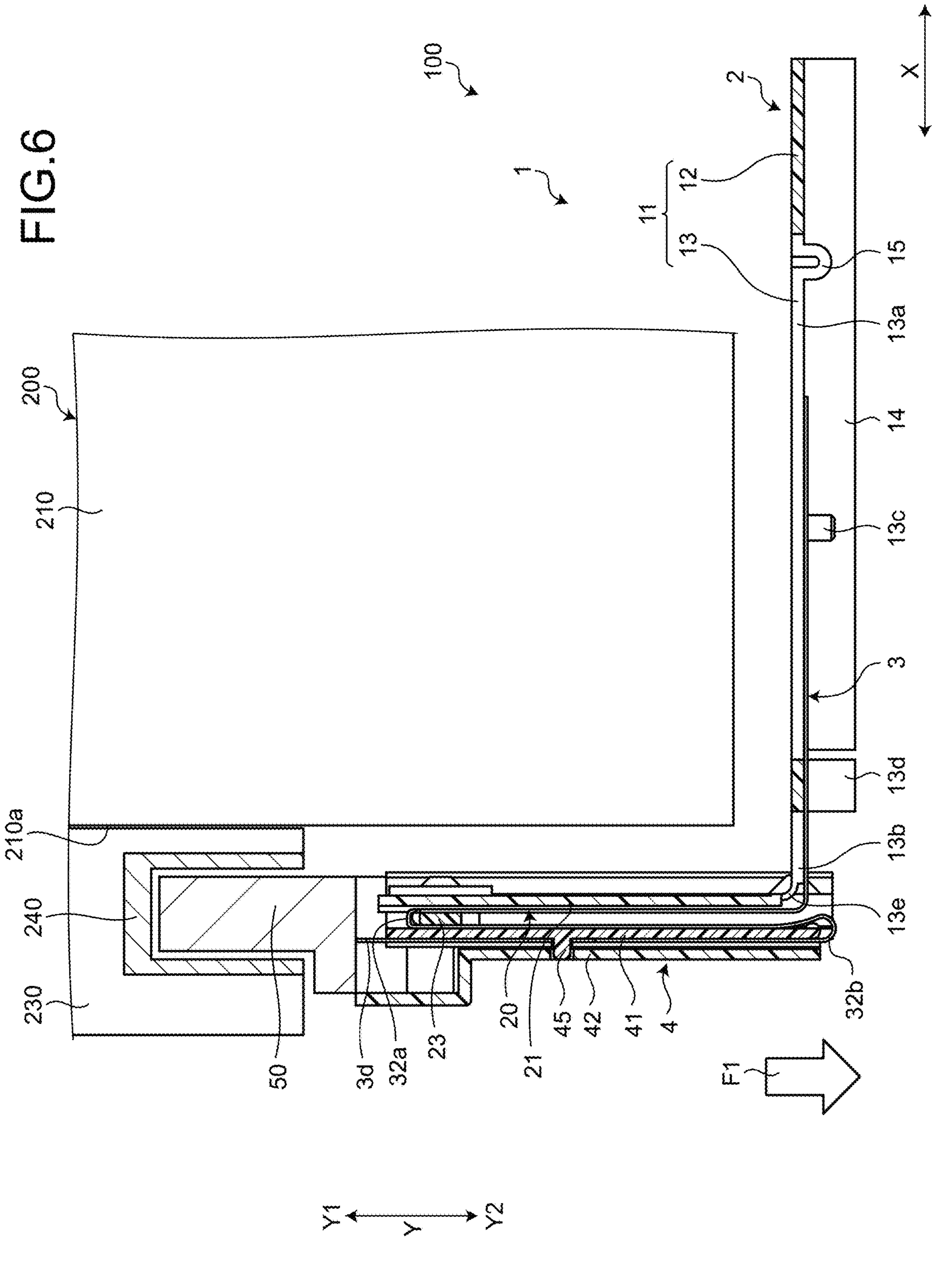
FIG. 6 is a cross-sectional view of the busbar module according to the embodiment.
Figure 7:
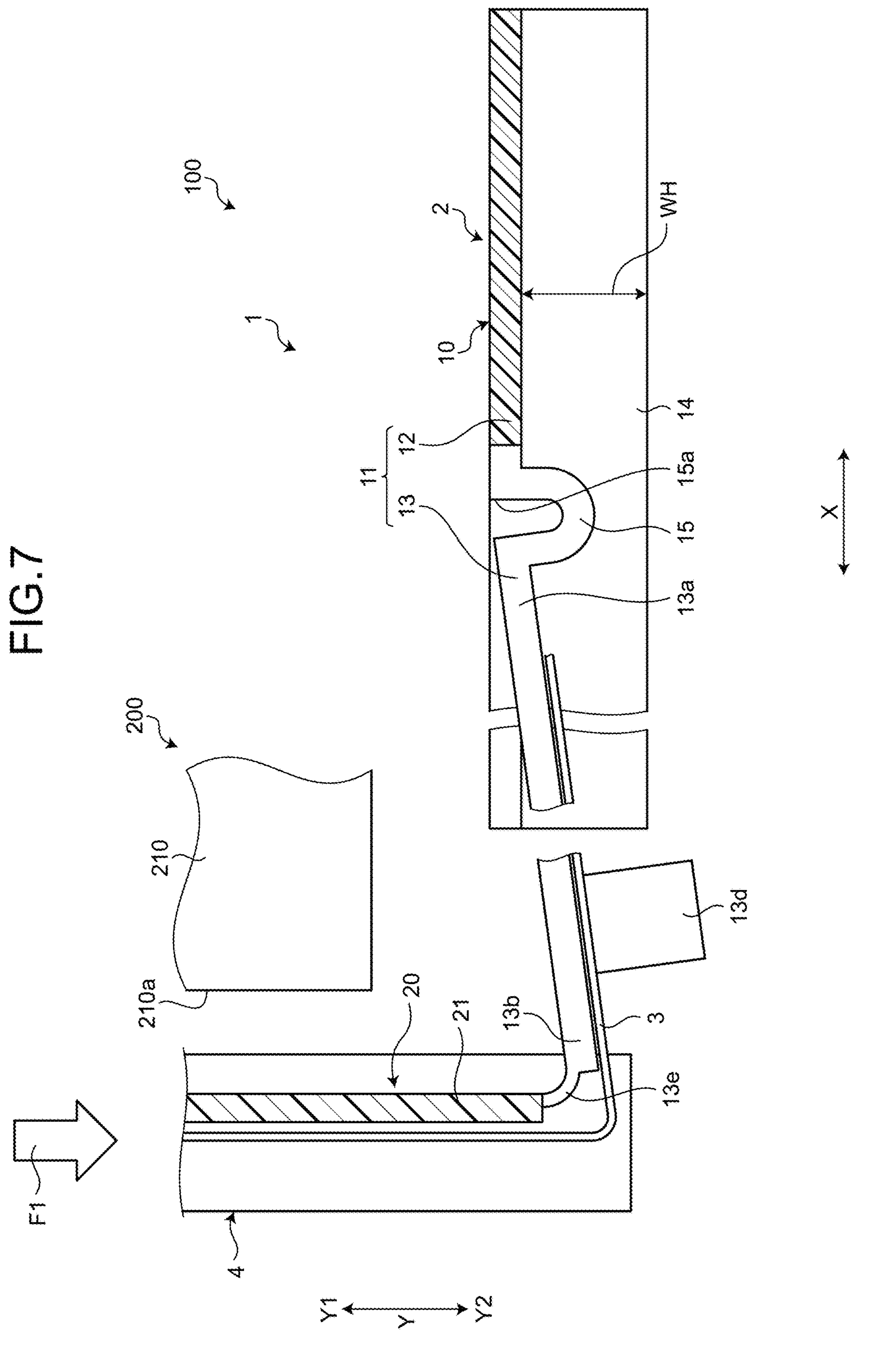
FIG. 7 is a cross-sectional view illustrating a swinging portion swung toward a second side.

Embodiments will be described with reference to FIGS. 1 to 7. The present embodiments relate to a protector and a busbar module. FIG. 1 is a plan view of the busbar module according to the embodiment, FIG. 2 is a perspective view of the protector of the embodiment, FIG. 3 is a perspective view of a protector body of the embodiment, FIG. 4 is a plan view of the protector body of the embodiment, FIG. 5 is an exploded perspective view of the protector of the embodiment, FIG. 6 is a cross-sectional view of the busbar module of the embodiment, and FIG. 7 is a cross-sectional view illustrating a swinging portion swung toward a second side. Illustrated in FIG. 6 is a cross section taken along line VI-VI in FIG. 2.

A protector 1 of the embodiment is a protective member for a flexible printed circuit board. The protector 1 constitutes, for example, a part of a busbar module 100. The busbar module 100 is assembled to a battery module 210 of a battery pack 200. The battery module 210 includes a plurality of battery cells 220. The battery cells 220 are arranged along a first direction X.

The busbar module 100 includes a plurality of busbars 110, a case 120, a flexible printed circuit board 3, a connector 50, and a protector 1. A busbar 110 can be connected to an electrode of a battery cell 220. The busbar 110 connects, for example, electrodes of two adjacent battery cells 220.

The case 120 accommodates the plurality of busbars 110 and the flexible printed circuit board 3. The case 120 is molded from, for example, insulating synthetic resin. The case 120 has holding portions that hold the busbars 110. The busbars 110 are arranged and held in the first direction X by the case 120. The case 120 is fixed to the battery module 210 while holding the plurality of busbars 110 and the flexible printed circuit board 3.

The flexible printed circuit board 3 includes a base film, a conductive layer, and a coverlay. The conductive layer is sandwiched and protected by the base film and the coverlay. The conductive layer is, for example, a conductive metal foil and has a circuit pattern including a plurality of detection lines. A detection line is connected to a corresponding busbar 110 or a thermistor. The detection lines are connected to a monitoring unit 230 of the battery pack 200 via the connector 50.

The protector 1 is disposed at, for example, an end of the case 120 in the first direction X. The flexible printed circuit board 3 is routed from the case 120 to the connector 50 via the protector 1.

As illustrated in FIG. 2, the protector 1 includes a protector body 2 and a sliding body 4. The sliding body 4 is slidable in a second direction Y while being guided by the protector body 2. As illustrated in FIG. 3, the protector body 2 includes a first passage portion 10 and a second passage portion 20. The protector body 2 is molded from, for example, insulating synthetic resin. The first passage portion 10 extends in the first direction X and can accommodate the flexible printed circuit board 3. The second passage portion 20 extends in the second direction Y and can accommodate the flexible printed circuit board 3. The second direction Y is orthogonal to the first direction X and is, for example, a direction along an end face of the battery module 210.

As described below, the protector body 2 of the present embodiment is configured such that the second passage portion 20 is swingable with respect to the first passage portion 10. In the protector 1 of the present embodiment, the connector 50 can be moved in the second direction Y to be fitted to a mating connector 240.

The protector body 2 is connected to an end of the case 120 in the first direction X. The protector body 2 may be a part of the case 120, may be engaged with the end of the case 120, or may be fixed to the battery module 210 or the like in such a manner as to be adjacent to the end of the case 120.

As illustrated in FIGS. 3 and 4, the first passage portion 10 has a bottom wall 11 and a pair of side walls 14. The bottom wall 11 supports the flexible printed circuit board 3. The pair of side walls 14 is disposed on both sides of the bottom wall 11 in a width direction W. The width direction W is a width direction of the bottom wall 11 and is a width direction of the flexible printed circuit board 3 placed on the bottom wall 11. The width direction W is orthogonal to both the first direction X and the second direction Y. The protector body 2 is fixed to the battery module 210 such that the bottom wall 11 and the side walls 14 extend in the first direction X. The pair of side walls 14 faces each other in the width direction W. The bottom wall 11 and the pair of side walls 14 form a groove-shaped passage for accommodating the flexible printed circuit board 3.

The bottom wall 11 has a distal end **13*b* which is an end on the second passage portion 20 side. The first passage portion 10 has a slit 11*s* extending between the bottom wall 11 and a side wall 14. The slit 11*s* is formed such that the distal end 13*b*** is swingable in the second direction Y.

The bottom wall 11 includes a base portion 12 and a swinging portion 13. The swinging portion 13 is separated from the side wall 14 by the slit **11*s*. The slit 11*s* is disposed between each of the pair of side walls 14 and the bottom wall 11. The base portion 12 is a portion disposed adjacent to the case 120 and is integrated with the side walls 14. In other words, in the base portion 12, there is no slit 11*s* provided between the bottom wall 11 and the side walls 14. The base portion 12 is fixed to the case 120 or the battery module 210 and supports the swinging portion 13** in a swingable manner.

A deformable portion 15 is provided at a boundary between the base portion 12 and the swinging portion 13 in the bottom wall 11. The deformable portion 15 is configured to be more elastically deformable than the swinging portion 13. The deformable portion 15 of the embodiment is curved in an arch shape. The deformable portion 15 having a curved shape is more likely to be flexurally deformed than the swinging portion 13, for example. This flexural deformation is elastic deformation that causes the swinging portion 13 to swing in the second direction Y and is deformation in which bending R of the deformable portion 15 increases or decreases.

The deformable portion 15 curved in an arch shape is stretchable in the first direction X. Therefore, the deformable portion 15 can displace the swinging portion 13 in the first direction X. The second passage portion 20 is connected to the swinging portion 13 and is displaced in the first direction X together with the swinging portion 13. Since the protector body 2 of the embodiment includes the deformable portion 15, workability of attaching and detaching the connector 50 to and from the mating connector 240 can be improved.

The swinging portion 13 has a proximal end **13*a* and a distal end 13*b*. The proximal end 13*a* is a portion connected to the deformable portion 15 and is an end close to the base portion 12. The distal end 13*b* is an end on a side far from the base portion 12 and is connected to the second passage portion 20. The swinging portion 13 is provided with a protrusion 13*c* for positioning the flexible printed circuit board 3. The shape of the protrusion 13*c* is, for example, a cylindrical shape. The protrusion 13*c* is inserted into a through hole of the flexible printed circuit board 3**.

The swinging portion 13 is provided with a pair of guard walls **13*d*. The guard walls 13*d* are arranged in the vicinity of the distal end 13*b* of the swinging portion 13. The guard walls 13*d* are arranged along extension lines of the side walls 14 and are adjacent to the side walls 14 in the first direction X. The pair of guard walls 13*d* faces each other in the width direction W. There is a gap between a guard wall 13*d* and a side wall 14 so that the guard wall 13*d* and the side wall 14 do not interfere when the swinging portion 13 swings. This gap is continuous with the slit 11*s***.

The length of the swinging portion 13 in the first direction X is determined depending on a swinging range required for the swinging portion 13. The length of the swinging portion 13 is set on the basis of a required stroke length of the connector 50 when the connector 50 is inserted into and removed from the mating connector 240. The stroke length of the connector 50 is a movement range in the second direction Y. The height of the side walls 14 is determined such that the flexible printed circuit board 3 does not exceed the side walls 14 when the swinging portion 13 swings.

The second passage portion 20 includes a bottom wall 21, a pair of guide portions 22, and a support portion 23. The bottom wall 21 supports the flexible printed circuit board 3. The guide portions 22 guide the sliding body 4 in the second direction Y. The second passage portion 20 has a pair of side walls 24. The pair of side walls 24 is disposed on both sides of the bottom wall 21 in the width direction W and extends in the second direction Y. The bottom wall 21 and the pair of side walls 24 form a groove-shaped passage for accommodating the flexible printed circuit board 3. A guide portion 22 is a through hole formed in a side wall 24 and extends in the second direction Y.

The support portion 23 forms a first folded portion 32*a* on the flexible printed circuit board 3. The support portion 23 is disposed at an end of the second passage portion 20 on a first side Y1. In the second direction Y, the first side Y1 is a front side in a fitting direction in a case where the connector 50 is fitted to the mating connector 240. A second side Y2 is a side from which the connector 50 is pulled out when the connector 50 is detached from the mating connector 240.

The support portion 23 is an arm-shaped portion extending in the width direction W and is rotatable with respect to the bottom wall 21. Illustrated in FIG. 3 is the support portion 23 engaged with the bottom wall 21. The support portion 23 in FIG. 3 faces the bottom wall 21 and has a gap from the bottom wall 21. The flexible printed circuit board 3 is accommodated in the second passage portion 20 in a state of being wound around the support portion 23 and folded back.

As illustrated in FIG. 5, the sliding body 4 includes a body 41 and a cover 42. The body 41 and the cover 42 are molded from, for example, insulating synthetic resin. The body 41 is assembled to the second passage portion 20 of the protector body 2 and slides with respect to the second passage portion 20. The body 41 includes a main wall 43 and a pair of legs 44.

The main wall 43 has a substantially flat-plate shape and supports the flexible printed circuit board 3. The main wall 43 has a first face 43*a* and a second face 43*b*. The first face 43*a* is a face to face the cover 42. The first face 43*a* is provided with protrusions 45 that lock the flexible printed circuit board 3.

The second face 43*b* is a face to face the bottom wall 21 of the second passage portion 20. The second face 43*b* forms a space between the second face 43*b* and the bottom wall 21. The flexible printed circuit board 3 that is folded back is accommodated in the space between the bottom wall 21 and the second face 43*b*. The flexible printed circuit board 3 is folded back in such a manner as to be wound around an end face 43*c* of the main wall 43. That is, the flexible printed circuit board 3 is folded back in a substantially U-letter shape in such a manner as to have a portion facing the first face 43*a* and a portion facing the second face 43*b*. The end face 43*c* is an end face of the main wall 43 on the second side Y2.

The legs 44 are inserted into the guide portions 22 of the protector body 2. The legs 44 protrude from the second face 43*b* of the main wall 43 in the first direction X. A claw 44*a* protruding in the width direction W is provided at the tip of a leg 44. The claw 44*a* is locked by the side wall 24 of the second passage portion 20. The sliding body 4 is coupled to the protector body 2 by the legs 44 and slides in the second direction Y.

The cover 42 is engaged with the body 41 to protect the flexible printed circuit board 3. The cover 42 includes a cover wall 46 and a holding portion 47. The cover wall 46 faces the first face 43*a*, and the flexible printed circuit board 3 is accommodated between the first face 43*a* and the cover wall 46. The cover wall 46 includes through holes 46*a* and an engagement portion 46*b*. The protrusions 45 of the body 41 are inserted into the through holes 46*a*. The engagement portion 46*b* is disposed on a side face of the cover wall 46 and engages with the body 41. The holding portion 47 is a portion that holds the connector 50. The holding portion 47 is disposed at an end of the cover 42 on the first side Y1.

Illustrated in FIG. 6 is the protector 1 in a state in which the connector 50 is fitted to the mating connector 240. As illustrated in FIG. 6, the monitoring unit 230 is disposed on an end face 210*a* of the battery module 210 in the first direction X. The monitoring unit 230 is fixed to the battery module 210. The monitoring unit 230 may be detachable from the battery module 210. The monitoring unit 230 has the mating connector 240 corresponding to the connector 50.

An end 3*d* of the flexible printed circuit board 3 is connected to the connector 50. The detection lines of the flexible printed circuit board 3 are connected to the monitoring unit 230 via the connector 50. The sliding body 4 is movable in the second direction Y together with the connector 50.

As illustrated in FIG. 6, the flexible printed circuit board 3 is accommodated in the second passage portion 20 in a state of having an extra length portion bent in a substantially S-letter shape. In a case where the sliding body 4 moves toward the first side Y1 with respect to the second passage portion 20, a part of the extra length portion of the flexible printed circuit board 3 is fed out. At this time, the sliding body 4 slides toward the first side Y1 while pulling out the extra length portion from an accommodation space of the second passage portion 20. On the other hand, in a case where the sliding body 4 moves towards the second side Y2 with respect to the second passage portion 20, the extra length portion that is fed is accommodated in an internal space of the second passage portion 20.

For example, the protector body 2 is formed such that the connector 50 is completely fitted to the mating connector 240 in a state where the swinging portion 13 is not swung in the second direction Y. In this case, when the connector 50 is completely fitted to the mating connector 240, no load is applied to the swinging portion 13 in the second direction Y. When force F1 directed toward the second side Y2 is applied to the connector 50 from the state illustrated in FIG. 6, the swinging portion 13 of the protector body 2 swings toward the second side Y2. Illustrated in FIG. 7 is the protector body 2 deformed by the force F1 directed toward the second side Y2.

As illustrated in FIG. 7, the protector body 2 can swing the swinging portion 13 about the deformable portion 15 as the center of rotation. The protector body 2 can further flexurally deform the swinging portion 13. When receiving the force F1 directed toward the second side Y2, the swinging portion 13 swings in such a manner as to move the distal end 13*b* toward the second side Y2. The second passage portion 20 moves to the second side Y2 in conjunction with the swinging of the swinging portion 13. As the second passage portion 20 moves toward the second side Y2, the connector 50 is pulled out from the mating connector 240. That is, the protector 1 of the embodiment enables the connector 50 to be removed from the mating connector 240 in a state where the protector body 2 and the monitoring unit 230 are each fixed.

As illustrated in FIG. 7, the protector body 2 has a thin portion 13*e*. The thin portion 13*e* is included between the distal end 13*b* of the swinging portion 13 and the bottom wall 21 of the second passage portion 20. The thin portion 13*e* is thinner than the swinging portion 13 and the bottom wall 21 and has high deformability with respect to the swinging portion 13 and the bottom wall 21. The thin portion 13*e* is elastically deformed when the swinging portion 13 swings in the second direction Y and can suppress the inclination of the second passage portion 20 with respect to the second direction Y. This reduces the force required to insert and remove the connector 50 into and from the mating connector 240.

Furthermore, the deformable portion 15 can be deformed in such a manner as to increase or decrease the opening width of an opening 15*a*. That is, the deformable portion 15 is stretchable in the first direction X. As the deformable portion 15 extends and contracts, the swinging portion 13 can be displaced in the first direction X. Accordingly, followability of the connector 50 to the mating connector 240 is improved.

A height WH of the side walls 14 is determined such that the flexible printed circuit board 3 can be accommodated between the pair of side walls 14 when the swinging portion 13 swings. Illustrated in FIG. 7 is the swinging portion 13 when the connector 50 is located in an external space of the mating connector 240. At this time, the side walls 14 face side faces of the flexible printed circuit board 3. Therefore, the side walls 14 can suppress displacement of the flexible printed circuit board 3 and can suppress the flexible printed circuit board 3 from riding on a side wall 14.

When the connector 50 is inserted into the mating connector 240, the swinging portion 13 swings toward the first side Y1 from the state illustrated in FIG. 7. The elastic restoring force of the protector body 2 assists the insertion force when the connector 50 is inserted into the mating connector 240. The protector 1 of the embodiment enables the connector 50 to be fitted to the mating connector 240 in a state where the protector body 2 and the monitoring unit 230 are each fixed.

As described above, the protector 1 of the embodiment includes the first passage portion 10 and the second passage portion 20. The first passage portion 10 extends in the first direction X and can accommodate the flexible printed circuit board 3. The second passage portion 20 extends in the second direction Y orthogonal to the first direction X and can accommodate the flexible printed circuit board 3. The second direction Y is a fitting direction in which the connector 50 connected to the flexible printed circuit board 3 is fitted to the mating connector 240.

The first passage portion 10 has the bottom wall 11 that supports the flexible printed circuit board 3 and side walls 14 arranged on both sides of the bottom wall 11 in the width direction W. The bottom wall 11 has a distal end 13*b* which is an end on the second passage portion 20 side. The first passage portion 10 has the slits 11*s* extending between the bottom wall 11 and the side walls 14 such that the distal end 13*b* is swingable in the second direction Y. The second passage portion 20 is connected to the distal end 13*b* of the bottom wall 11 and is swingable in the second direction Y. The protector 1 of the embodiment swings the second passage portion 20 in the fitting direction, whereby workability of work of inserting and removing the connector 50 into and from the mating connector 240 can be improved.

The bottom wall 11 of the embodiment includes the swinging portion 13 and the base portion 12. The swinging portion 13 is separated from the side wall 14 by the slit 11*s*. The base portion 12 is integral with the side walls 14. The deformable portion 15 may be provided at the boundary between the base portion 12 and the swinging portion 13 in the bottom wall 11. The deformable portion 15 has higher deformability than the swinging portion 13. For example, the deformable portion 15 may be formed to have a lower rigidity than the swinging portion 13 with respect to force in the first direction X or may be formed to have a smaller rigidity than the swinging portion 13 with respect to force in the width direction W. The deformable portion 15 can improve followability of the connector 50 with respect to the mating connector 240.

The deformable portion 15 illustrated as an example is curved in an arch shape and is stretchable in the first direction X. The deformable portion 15 stretchable in the first direction X can allow for displacement of the connector 50 in the first direction X.

The busbar module 100 of the embodiment includes the protector 1, the flexible printed circuit board 3, the connector 50 connected to the flexible printed circuit board 3, and the plurality of busbars 110 connected to the flexible printed circuit board 3 and connectable to electrodes of the battery cells 220. The busbar module 100 of the embodiment can improve workability of the work of inserting and removing the connector 50 into and from the mating connector 240.

The protector 1 of the embodiment includes the sliding body 4 slidable in the second direction Y with respect to the protector body 2. The sliding body 4 is directly or indirectly connected to the connector 50 and can slide together with the connector 50. The sliding body 4 can assist the stroke of the connector 50 in the second direction Y. For example, a part of the required stroke length of the connector 50 may be implemented by a slide structure including the sliding body 4.

Note that the shape of the deformable portion 15 is not limited to the arch shape illustrated as an example. The deformable portion 15 may be, for example, a hinge portion integrally molded with the base portion 12 and the swinging portion 13.

The content disclosed in the above embodiments can be implemented in combination as appropriate.

In a protector according to the present embodiment, a bottom wall of a first passage portion has a distal end which is an end on a second passage portion side, the first passage portion having a slit extending between the bottom wall and a side wall such that the distal end is swingable in a second direction, and a second passage portion is connected to a distal end of the bottom wall and is swingable in the second direction. According to the protector of the present embodiment, it is possible to achieve the effect of improving the workability of the work of connecting a connector connected to a flexible printed circuit board to a mating connector.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A protector comprising:

a first passage portion extending in a first direction and capable of accommodating a flexible printed circuit board; and a second passage portion extending in a second direction orthogonal to the first direction and capable of accommodating the flexible printed circuit board, wherein the second direction is a fitting direction in which a connector connected to the flexible printed circuit board is fitted to a mating connector, the first passage portion has a bottom wall that supports the flexible printed circuit board and side walls arranged on both sides of the bottom wall in a width direction, the bottom wall has a distal end which is an end on a side of the second passage portion, the first passage portion has slits extending between the bottom wall and the side walls such that the distal end is swingable in the second direction, and the second passage portion is connected to the distal end of the bottom wall, the second passage portion swingable in the second direction.

2. The protector according to claim 1, wherein the bottom wall has a swinging portion and a base portion, the swinging portion separated from the side walls by the slits, and the base portion integrated with the side walls, and a deformable portion having higher deformability than the swinging portion is provided to the bottom wall at a boundary between the base portion and the swinging portion in the bottom wall.

3. The protector according to claim 2, wherein the deformable portion is curved in an arch shape and is stretchable in the first direction.

4. A busbar module comprising:

the protector according to claim 1;

the flexible printed circuit board;

the connector connected to the flexible printed circuit board; and a plurality of busbars connected to the flexible printed circuit board, the plurality of busbars connectable to electrodes of battery cells.

* * * * *